United States Patent [19]
Yoshida et al.

[11] 4,288,849
[45] Sep. 8, 1981

[54] MACHINE TOOL CONTROL SYSTEMS

[75] Inventors: Tetsu Yoshida; Katsunori Higashikawa, both of Numazu, Japan

[73] Assignee: Toshiba Kikai Kabushiki Kaisha, Tokyo, Japan

[21] Appl. No.: 9,677

[22] Filed: Feb. 5, 1979

[30] Foreign Application Priority Data

Feb. 8, 1978 [JP] Japan .................................. 53-13167

[51] Int. Cl.³ ......................................... G05B 19/417
[52] U.S. Cl. ................................... 364/102; 364/119; 364/474; 318/562
[58] Field of Search ............... 364/102, 101, 107, 119, 364/474, 200 MS File, 900 MS File, 551; 318/563, 565, 562

[56] References Cited

U.S. PATENT DOCUMENTS

| 3,555,516 | 1/1971 | Proctor .............................. | 364/900 |
| 3,576,540 | 4/1971 | Fair et al. ........................... | 364/200 |
| 3,668,653 | 6/1972 | Fair et al. ........................... | 364/107 X |
| 4,079,235 | 3/1978 | Froyd et al. ...................... | 364/474 X |
| 4,100,597 | 7/1978 | Fleming et al. ................. | 364/900 X |
| 4,176,396 | 11/1979 | Howatt ............................... | 364/474 |

Primary Examiner—Joseph F. Ruggiero
Attorney, Agent, or Firm—Koda and Androlia

[57] ABSTRACT

A machine tool control system includes a numerical control device associated with each machine tool and an interface unit interposed between each machine tool and the numerical control device. The numerical control device includes a first memory area for storing a first group of programs related to the machining of a workpiece and the selection of a cutting tool, and a second memory area for storing a second group of programs related to interrupting instructions.

5 Claims, 1 Drawing Figure

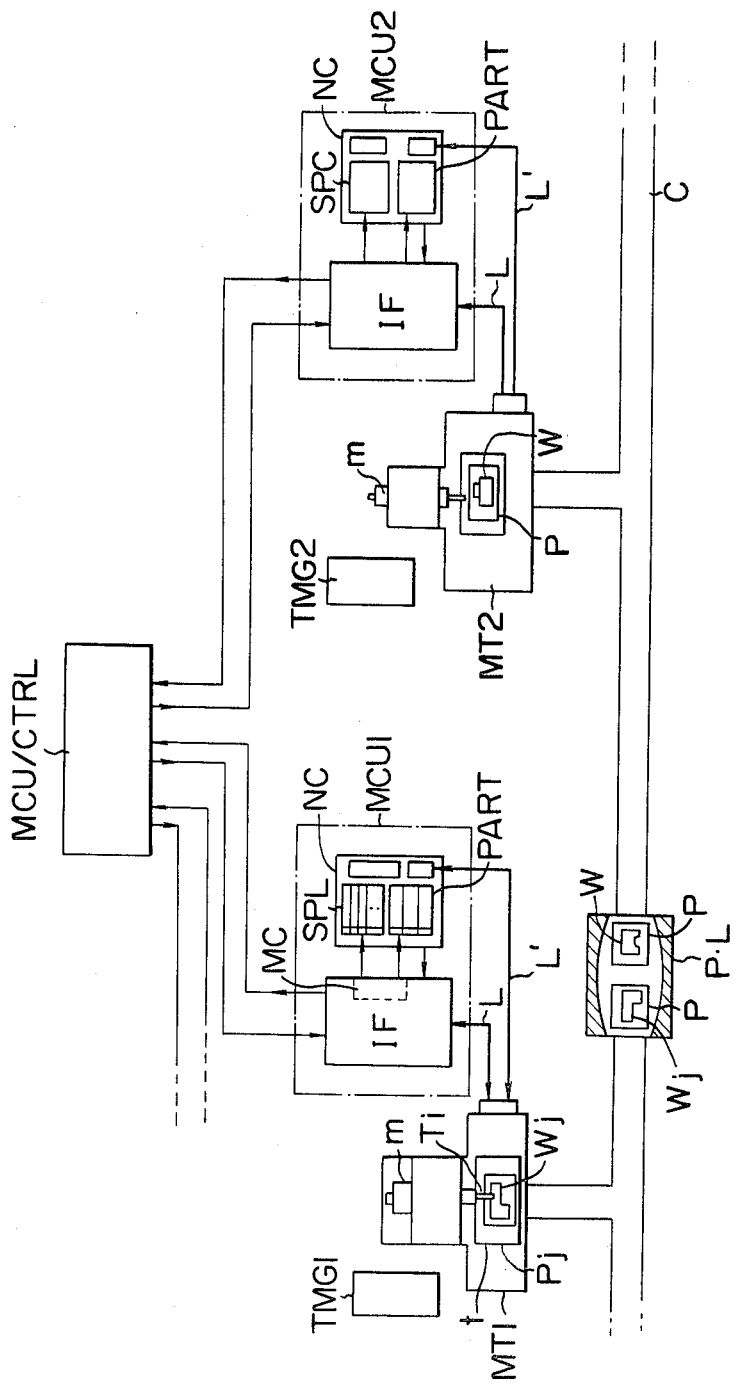

MACHINE TOOL CONTROL SYSTEMS

BACKGROUND OF THE INVENTION

This invention relates generally to control systems of machine tools, and more particularly to a type thereof capable of controlling machine tool or tools in a fully automatic manner.

In conventional machine-tool control systems of the above described type, the machine tools and their peripheral apparatus, for instance, conveyors for the workpieces, cutting-scrap handling apparatus, and tool magazine transporting apparatus, have been so constructed that they are operable independently.

Accordingly, when it is desired to operate these machine tools and their peripheral apparatus as one system, while maintaining a predetermined relationship between each other, there must be provided a supervisory apparatus (such as a computer) which delivers instructions, for instance, for starting, stopping, and restarting the machine tools and the peripheral apparatus, or otherwise each machine tool must be provided with a loop circuit capable of generating a restarting signal.

In the former case where a supervisory apparatus is provided, however, when the operation of the system includes the conveyance of the workpiece, and the retraction of required parts at the time of abnormal cutting operation and the replacement of the cutting tool or the like, both require wide movements of the machine tool with respect to various axes (hereinafter referred to axis-movements of the machine tool), the control system becomes highly complicated, thus increasing cost and reducing the adaptability of the control system.

In the case where loop circuits are provided in the machine tools, there is a possibility of accidental operation of such loop circuits thereby causing dangerous unattended operation of restarting and stopping the machine tools.

Also known is a control system wherein the supervisory computer includes a part common for the operations (such as distribution of data and on-off control of the cycle start) of the ordinary numerical control (NC) devices of the NC type machine tools, and at this time each NC device of the machine tool carries out remaining part of the NC operation, such as interpolation and else. However, such an arrangement is also found to have problems in the cost and the adaptability.

As is widely known, present-day machine tools constituting the components of the control system have their own NC devices, and the conveyor apparatus and the like also have their own controllers, all of the NC devices and the controllers being operable independently.

In order that an NC device is capable of suitably, controlling the corresponding machine tool, there must be provided an interface between the NC device and the machine tool, through which are executed most of the sequential operations other than those accompanying the axis-movements of the machine tool. Furthermore, the controllers themselves of the conveyors and the like are also provided with interfaces regardless of whether instruction input means are provided for each controller or not. Thus, where a system comprising the above described components is to be operated fully automatically, although the controls accompanying no such axis-movements of the machine tools are carried out through interfaces, the controls accompanying the axis-movements of the machine tools are carried out separately (this point constitutes no problem if the numerical control devices are of the CNC (computerized NC) type including sequential controls of the machine tools).

In the operation of the above described control systems, there are many problems to be solved including:

(1) On-off control of the power source at designated time instants.

(2) Operation control of each machine control unit (interface + NC device).

In response to those signals indicative of, for instance, the completion of machining, occurrence of any abnormal cutting, and alarming condition or the like arising in the course of the operation of each independent machine tool, it is required that various signals such as for restarting, retract cycles, alarming and the like be sent out to the machine control unit MCU. Otherwise, if it is required, a sequence control of each MCU must be carried out. (When the tact-time is different, the status of each machine tool should also be displayed.)

(3) Calling out of a program as a part-program at one time. Since the required part-program is made apparent from the pallet code or from the sequence of the entire system or else, this part-program is read out from a memory area where the part-program is stored, and then executed.

As for the problem (1) described above, known is a control operation wherein the power source is turned off at a predetermined time in night (timer-setting systems). However, no warming-up operation of machine tools have yet been practiced.

As for the problem (2), there has been proposed a control system in the form of a loop circuit wherein Cycle-Start is generated after the completion of a machining step, thereby rewinding and restarting the tape. However, this method is dangerous, and it is almost impossible to carry out necessary countermeasures upon sensing the alarm of an abnormal cutting or else, and to continue the fully automatic control of the machine tools thereafter.

As for the problem (3), as a matter of course, a block-by-block designation of the content of a part program to be executed has not yet been attempted.

SUMMARY OF THE INVENTION

A primary object of the present invention is to provide a machine tool control system wherein the above described difficulties are duly obviated.

Another object of the invention is to provide a machine tool control system wherein a machine control unit (MCU) for each machine tool has far better adaptability than that of the conventional MCU.

According to the present invention, there is provided a machine tool control system comprising a numerical control device associated with a machine tool and an interface unit interposed between the machine tool and the numerical control device, the numerical control device including a first memory area which stores a first group of programs related to the machining of a workpiece and also to the selection of cutting tools suitable for the machining, and a second memory area which stores a second group of programs to be executed in interruption of the first group of programs and accompanying the axis-movements of the machine tool, as in the cases of retraction at the time of abnormal cutting, and selection and replacement of the cutting tools, and the interface unit providing access to each unit program of the first and second program groups.

Where the machine tool to be controlled is a single machine tool, a microprocessor may be provided in the interface unit for providing access to each unit program of the first and second program groups depending on the states of sequence signals arriving at the interface unit.

In the case where a plurality of machine tools are to be controlled, a central control unit may be further provided for monitoring sequence signals arriving at the interface unit for each machine tool, and this control unit may provide access in accordance with a predetermined process program to the first and second program groups stored in the numerical control device through the interface unit corresponding thereto.

BRIEF DESCRIPTION OF THE ACCOMPANYING DRAWING

In the accompanied drawing, a single FIGURE is a block diagram showing a control system of machine tools, which constitutes a preferred embodiment of the invention.

DESCRIPTION OF THE PREFERRED EMBODIMENT

Referring now to the accompanying drawing showing a preferred embodiment of the present invention, the operations of machine tools MT1 and MT2 are controlled respectively by machine control units MCU1 and MCU2, each comprising an interface unit IF and a numerical control device NC. The interface unit IF in each MCU is connected to an MCU controller (MCU/CTRL) which supervises the MCU1 and MCU2.

A workpiece W is mounted on a pallet P, which in turn is mounted on a pallet loader PL of a self-propelling type, and moved along a transfer line C. Tool magazines TMG1 and TMG2 are also provided for respective machine tools MT1 and MT2.

The numerical control device NC has a memory area termed sub-program linkage SPL, beside of the conventional memory area storing ordinary part-programs. In the sub-program linkage SPL, there are memorized programs of interrupting nature (interrupting the part programs stored in the conventional area), inclusive of the instructions instructing the axis-movements of the machine tool, such as a retract cycle movement at the time of abnormal cutting and a tool selecting and replacing operations. Between the interface unit IF of the machine control unit MCU1 and the machine tool MT1, machine operating sequence signals are transmitted and received through a line L. Also between the NC device and the machine tool MT1, are transmitted and received shaft driving pulses, feed-back pulses, and the like through a line L'. Various sequence signals are also delivered from the NC device to the interface unit IF.

The MCU controller MCU/CTRL is monitoring the sequence signals, arriving at each interface IF, in accordance with a predetermined supervising program, and where it is necessary required signals are sent out such as a Feed Hold signal (for stopping the relative movements between the workpiece and the cutting tool), a Reset signal of the NC device, a Cycle Start signal of the NC device, a signal for designating required addresses in the memory area SPL of the NC device, a signal for designating the numbers of the required part-programs stored in the NC device, and a signal instructing completion of the cutting operation, toward the interface IF of the machine control unit MCU. That is, the NC device is controlled through the interface IF by the MCU controller MCU/CTRL.

The monitoring program for the MCU controller is so determined that it controls a plurality of interfaces IF in the machine control units, and therefore the machine control units in an operatively related manner.

The MCU controller MCU/CTRL is required when a plurality of machine tools are controlled as shown in the drawing. However in a specific case where a single machine tool with a machine control unit MCU is operated independently, a microprocessor controller MC, instead of the MCU controller, may be provided in the MCU or in the interface unit IF in a manner such that the microprocessor controller MC monitors the sequence signals arriving at the interface unit IF from the NC side and the machine tool side, and delivers the above described Feed Hold signal, Cycle Start signal, or Rest signal of the NC device or assigns the required SPL or the required part programs as described above.

In a full automatic control of a machine tool or tools, an operating program including an on-off control of the power source and a warming-up control of the machine tools is essential. For this reason, an on-off control program, or warming-up program may be contained in the monitoring program of the MCU controller, or such a program may be prepared as one part of the SPL of the NC device in the machine control unit MCU.

The control operation of the above described control system for controlling a plurality of machine tools will now be described with reference to the accompanying drawing.

It is assumed that a pallet Pj carrying a work piece Wj is transported on a pallet loader PL along the transfer line C, and that the work piece Wj on the pallet Pj is finally set on a table t of the machine tool MT1. When a signal j identifying the work piece Wj is read from the pallet Pj on the table t the signal j is sent to the interface unit IF. Then the MCU controller MCU/CTRL recognizes the setting of the pallet Pj on the table t. The MCU controller thus designates through the interface IF a part program PAj corresponding to the work piece Wj among the part programs stored in the NC device, and the part program PAj is executed for successive blocks.

When a cutting tool Ti is broken while executing a block of the part program PAj, and when the breakage of the tool is detected, for instance, by monitoring the current of a spindle driving motor m as disclosed in a co-pending U.S. Patent Application Ser. No. 955,173 filed Oct. 26, 1978, U.S. Pat. No. 4,249,243, a flag signal FBRK indicative of the broken tool is set in the interface unit IF.

The MCU controller immediately recognizes this condition, and delivers a Feed Hold signal to the interface unit IF with a priority over the execution of the program block of the part program PAj. That is, the movements with respect to the axes of the machine tool MT1 are now initiated.

The MCU controller then designates a program which is relevant to a retract cycle and is stored in the memory region SPL in the NC device. The number of the block of the part program which has been executed is thus saved in a register within the interface IF, and the machine tool MT1 starts to practice the retract cycle inclusive of the shaft movement, until the cutting tool Ti is separated by a predetermined distance from the work piece Wj.

Then, the MCU controller MCU/CTRL designates, through the interface unit IF, a tool selecting and replacing program stored in the memory area SPL in the NC device, the program instructing the selection of a cutting tool Tia from those stored in the magazine TMG1 and the replacement of the damaged cutting tool Ti by the selected cutting tool Tia.

It should be noted that the fact that the cutting tool Ti has been broken is held as its history (TiBRK = 1). Furthermore, for instance, the execution of the program block within the part program PAj, which has been saved in the register of the IF unit may be indicated in the last program block of the cutting tool selecting and replacing program. The flag indicative of the broken cutting tool FBRK displayed in the interface unit IF is reset upon selection of the new cutting tool Tia, and the machining of the work piece Wj is then resumed.

Otherwise, the MCU controller may designate the SPL so that the workpiece Wj is removed out of the table t of the machine tool MT1 when the machine tool Ti is broken. In this case, a part program PAk for transporting another work piece Wk onto the table t, which has been beforehand stored in the memory region SPL in the NC device, is designated by the MCU controller MCU/CTRL through the interface unit IF. Furthermore, the fact that the cutting tool Ti is in the broken state is recorded in its history. In addition, it is so arranged that when the broken cutting tool Ti is again designated for actual machining of a new work piece Wk regardless of the fact that a substituting cutting tool Tia has been selected in accordance with the tool code, the new tool Tia is fixed to the spindle of the machine tool MT1 instead of the broken cutting tool Ti.

When the machining of a workpiece on the last pallet (Last P) is completed, a power-source turning-off program stored in the SPL in the NC device is designated by the MCU controller upon reception of the completion signal. With this program, the power source is turned off after the last pallet (Last P) is moved to a predetermined position adapted for the transfer of the pallet onto a pallet loader PL corresponding thereto.

In the above description, the descriptions regarding the conveyance control of the pallet loader PL along the transfer line C, and the countermeasure for the case of no replacing tools in the tool magazine, are both omitted because these have no direct relation with the subject matter of the present invention. If it is desired to know more about these controls, reference to the aforementioned U.S. Patent Application Ser. No. 955,173, U.S. Pat. No. 4,249,243 is recommended.

According to the present invention, sub-program linkage SPL is provided in the NC device for storing cycle-operation programs accompanying axis-movements of the machine tool, and since the sub-program linkage is made accessible through the interface unit as in the case of the part programs, a control system of machine tool or tools having wide adaptability (capable of machining various workpieces for a long period, and also adapting to extraordinary conditions such as broken cutting tool) can be thereby obtained.

We claim:

1. A machine tool control system for controlling a plurality of machine tools, said system comprising machine control units, each comprising a numerical control device and an interface unit interposed between each machine tool and the numerical control device, and respectively provided for the machine tools, said numerical control device including a first memory area which stores a first group of programs related to the machining of a workpiece and also to the selection of cutting tools suitable for the machining, and a second memory area which stores a second group of programs for executing an interruption instruction for retracting an abnormal tool and exchanging the abnormal tool with a substitute tool or the like operation, and a machine control unit controller which monitors sequence signals arriving at said interface unit and provides access to said first and second program groups stored in said numerical control device through said interface unit in accordance with a predetermined process program.

2. A machine tool control system as set forth in claim 1 wherein the content of a program for warming-up each machine tool is also stored in said second memory area of each of said numerical control device, and under an instruction from the control unit controller, an access is made to said warming-up program through an interface unit corresponding thereto.

3. A machine tool control system as set forth in claim 1 wherein a program for turning-off the power source for each machine tool is also stored in said first memory area of said numerical control device corresponding thereto, and under the control of the control unit controller, an access is made to said turning-off program for the power source through said interface unit corresponding to the machine tool.

4. A machine tool control system as set forth in claim 1, wherein a Feed Hold instruction is delivered from said MCU controller through said interface unit to the machine tool.

5. A machine tool control system as set forth in claim 1, wherein a cycle-start signal and a reset signal are delivered from said MCU controller through said interface unit to said numerical control device for bringing the numerical control device into a cycle-start condition and a reset condition, respectively.

* * * * *